（12） United States Patent
Deluca et al.

(10) Patent No.: US 11,443,343 B2
(45) Date of Patent: Sep. 13, 2022

(54) REMOVAL OF IRRELEVANT ELECTRONIC MESSAGES

(71) Applicant: INTERNATIONAL BUSINESS MACHINES CORPORATION, Armonk, NY (US)

(72) Inventors: Lisa Seacat Deluca, Baltimore, MD (US); Jeremy A. Greenberger, Durham, NC (US); James R. Kozloski, New Fairfield, CT (US)

(73) Assignee: International Business Machines Corporation, Armonk, NY (US)

( * ) Notice: Subject to any disclaimer, the term of this patent is extended or adjusted under 35 U.S.C. 154(b) by 1288 days.

(21) Appl. No.: 14/968,948

(22) Filed: Dec. 15, 2015

(65) Prior Publication Data

US 2017/0169470 A1 Jun. 15, 2017

(51) Int. Cl.
*G06Q 30/02* (2012.01)
*H04W 4/021* (2018.01)
(Continued)

(52) U.S. Cl.
CPC ..... *G06Q 30/0255* (2013.01); *G06Q 30/0267* (2013.01); *H04L 51/212* (2022.05);
(Continued)

(58) Field of Classification Search
CPC .......... G06F 17/30876; G06Q 30/0261; G06Q 30/02; G06Q 30/0631; G06Q 10/067; G06Q 10/10; G06Q 30/0601; G06Q 40/12; G06Q 10/08; G06Q 2220/00; G06Q 30/0269; G06Q 10/025; G06Q 10/063; G06Q 20/02; G06Q 20/385; G06Q 20/405; G06Q 30/0201; G06Q 30/0241; G06Q 30/0255; G06Q 30/0267; G06Q 30/0283; G06Q 40/00; G06Q 40/06; G06Q 40/08;
(Continued)

(56) References Cited

U.S. PATENT DOCUMENTS 7,113,917 B2 9/2006 Jacobi et al.
2005/0204005 A1 * 9/2005 Purcell ................. G06Q 10/107
709/206

(Continued)

FOREIGN PATENT DOCUMENTS

WO WO-2015135066 A1 * 9/2015 ............. G06F 17/00

OTHER PUBLICATIONS

P. Mell et al., "The NIST Definition of Cloud Computing", National Institute of Standards and Technology, Information Technology Laboratory, Sep. 2011, pp. 1-7.

(Continued)

*Primary Examiner* — Chinyere Mpamugo
(74) *Attorney, Agent, or Firm* — L. Jeffrey Kelly

(57) ABSTRACT

A processor-implemented method, system, and/or computer program product blocks irrelevant message targeted to mobile electronic device. One or more processors identify a contextual history and a cognitive state of a person while in a physical venue. The processor(s) block the electronic message targeted to a mobile electronic device in use by the person based on the contextual history of the person and the cognitive state of the person while in the physical venue, such that the electronic message is deemed to be an irrelevant message.

6 Claims, 7 Drawing Sheets

(51) Int. Cl.
  *H04L 67/12* (2022.01)
  *H04L 67/10* (2022.01)
  *H04W 4/12* (2009.01)
  *H04L 67/04* (2022.01)
  *H04L 51/212* (2022.01)
  *H04L 67/52* (2022.01)
  *H04L 67/50* (2022.01)
  *H04W 4/029* (2018.01)
  *H04L 51/222* (2022.01)

(52) U.S. Cl.
  CPC .............. *H04L 67/04* (2013.01); *H04L 67/10* (2013.01); *H04L 67/12* (2013.01); *H04L 67/52* (2022.05); *H04L 67/535* (2022.05); *H04W 4/021* (2013.01); *H04W 4/12* (2013.01); *H04L 51/222* (2022.05); *H04W 4/029* (2018.02)

(58) Field of Classification Search
  CPC .... G06Q 50/01; G06Q 50/22; G06Q 30/0273; G06Q 20/102; G06Q 30/0242; G06Q 30/0271; G06Q 30/0276; G06Q 30/0212; G06Q 30/0213; G06Q 30/0219; G06Q 30/0223; G06Q 30/0235; G06Q 30/0236; G06Q 30/0238; G06Q 30/0252; G06Q 30/0264; G06Q 30/0272; G06Q 30/0207–0277; H04L 67/10; H04L 51/12; H04L 67/12; H04L 67/18; H04L 67/04; H04L 67/22; H04L 51/20; H04L 51/212; H04L 67/52; H04L 67/535; H04L 51/222; G06N 5/04; G06N 20/00; G06N 5/02; G06N 5/022; G06N 5/043; G06N 3/004; G06N 5/048; H04W 4/025; H04W 4/14; H04W 4/18; H04W 4/027; H04W 4/38; H04W 4/50; H04W 84/18; H04W 4/021; H04W 68/02; H04W 4/12; H04W 4/029
  See application file for complete search history.

(56) References Cited

U.S. PATENT DOCUMENTS

| | | | | |
|---|---|---|---|---|
| 2006/0293956 | A1* | 12/2006 | Walker | G06Q 30/0269 705/14.15 |
| 2010/0042470 | A1 | 2/2010 | Chang et al. | |
| 2010/0082431 | A1* | 4/2010 | Ramer | G06Q 30/02 705/14.52 |
| 2011/0153466 | A1* | 6/2011 | Harish | G06Q 10/087 705/28 |
| 2011/0302011 | A1* | 12/2011 | Yoder | G06Q 20/40 705/14.17 |
| 2011/0320120 | A1 | 12/2011 | Tielens | |
| 2013/0297422 | A1* | 11/2013 | Hunter | G06Q 30/0261 705/14.58 |
| 2013/0317382 | A1* | 11/2013 | Le | A61B 5/375 600/547 |
| 2014/0067901 | A1* | 3/2014 | Shaw | G06Q 10/10 709/201 |
| 2015/0106467 | A1 | 4/2015 | Robarts et al. | |
| 2015/0356626 | A1* | 12/2015 | Chawla | G06N 20/00 705/14.66 |
| 2016/0252957 | A1* | 9/2016 | Raux | G06F 3/013 345/156 |

OTHER PUBLICATIONS

IP.com, "Providing Content to a User Utilizing a Mood of the User", IP.com, IPCOM000219179D, Jun. 25, 2012.

* cited by examiner

REMOVAL OF IRRELEVANT ELECTRONIC MESSAGES

BACKGROUND

The present disclosure relates to the field of computer systems, and specifically to the field of computer systems that display electronic messages. Still more specifically, the present disclosure relates to removing and/or blocking irrelevant electronic messages from a mobile electronic device.

SUMMARY

A processor-implemented method, system, and/or computer program product blocks irrelevant message targeted to a mobile electronic device. One or more processors identify a contextual history and a cognitive state of a potential customer while in a physical venue. The processor(s) identify an electronic message related to a target product that is located within a target product location within the physical venue. The processor(s) block the electronic message targeted to a mobile electronic device in use by the potential customer based on the contextual history of the potential customer and the cognitive state of the potential customer while in the physical venue, such that the electronic message is deemed to be an irrelevant message.

DETAILED DESCRIPTION

Figure 1:
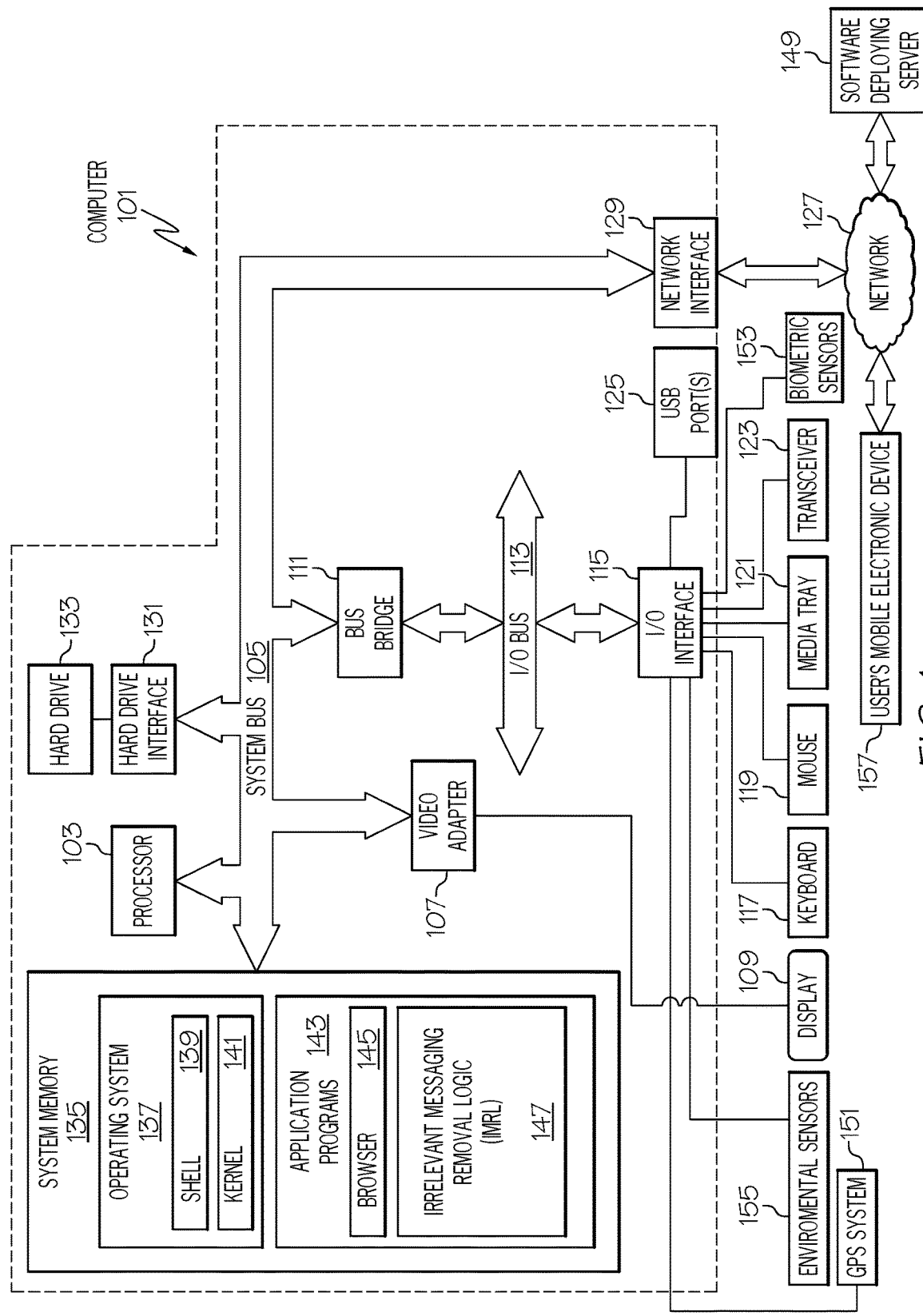
FIG. 1 depicts an exemplary system and network in which the present disclosure may be implemented.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium is any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including, but not limited to, wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

With reference now to the figures, and in particular to FIG. 1, there is depicted a block diagram of an exemplary system and network that may be utilized by and in the implementation of the present invention. Note that some or all of the exemplary architecture, including both depicted hardware and software, shown for and within computer 101 may be utilized by software deploying server 149 and/or user's mobile electronic device 157 shown in FIG. 1.

Exemplary computer 101 includes a processor 103 that is coupled to a system bus 105. Processor 103 may utilize one or more processors, each of which has one or more processor cores. A video adapter 107, which drives/supports a display 109, is also coupled to system bus 105. System bus 105 is coupled via a bus bridge 111 to an input/output (I/O) bus 113. An I/O interface 115 is coupled to I/O bus 113. I/O interface 115 affords communication with various I/O devices, including a keyboard 117, a mouse 118, a media tray 121 (which may include storage devices such as CD-ROM drives, multi-media interfaces, etc.), a transceiver 123 (capable of sending and receiving wireless signals, including radio wave signals, near field communication (NFC) signals, Wi-Fi signals, etc.), and external USB port(s) 125. While the format of the ports connected to I/O interface 115 may be any known to those skilled in the art of computer architecture, in one embodiment some or all of these ports are universal serial bus (USB) ports.

As depicted, computer 101 is able to communicate with a software deploying server 149 and/or user's mobile electronic device 157 using a network interface 129. Network interface 129 is a hardware network interface, such as a network interface card (NIC), etc. Network 127 may be an external network such as the Internet, a wireless cellular network, or an internal network such as an Ethernet or a virtual private network (VPN). In one or more embodiments, environmental sensors 155, GPS system 151, transceiver 123, biometric sensors 153, and/or user's mobile electronic device 157 is accessible to computer 101 via network 127.

A hard drive interface 131 is also coupled to system bus 105. Hard drive interface 131 interfaces with a hard drive 133. In one embodiment, hard drive 133 populates a system memory 133, which is also coupled to system bus 105. System memory is defined as a lowest level of volatile memory in computer 101. This volatile memory includes additional higher levels of volatile memory (not shown), including, but not limited to, cache memory, registers and buffers. Data that populates system memory 135 includes computer 101's operating system (OS) 137 and application programs 143.

OS 137 includes a shell 139, for providing transparent user access to resources such as application programs 143. Generally, shell 139 is a program that provides an interpreter and an interface between the user and the operating system. More specifically, shell 139 executes commands that are entered into a command line user interface or from a file. Thus, shell 139, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 141) for processing. Note that while shell 139 is a text-based, line-oriented user interface, the present invention will equally well support other user interface modes, such as graphical, voice, gestural, etc.

As depicted, OS 137 also includes kernel 141, which includes lower levels of functionality for OS 137, including providing essential services required by other parts of OS 137 and application programs 143, including memory management, process and task management, disk management, and mouse and keyboard management.

Application programs 143 include a renderer, shown in exemplary manner as a browser 145. Browser 145 includes program modules and instructions enabling a world wide web (WWW) client (i.e., computer 101) to send and receive network messages to the Internet using hypertext transfer protocol (HTTP) messaging, thus enabling communication with software deploying server 149 and other computer systems.

Application programs 143 in computer 101's system memory (as well as software deploying server 149's system memory) also include an Irrelevant Messaging Removal Logic (IMRL) 147. IMRL 147 includes code for implementing the processes described below, including those described in FIGS. 2-4. In one embodiment, computer 101 is able to download IMRL 147 from software deploying server 149, including in an on-demand basis, wherein the code in IMRL 147 is not downloaded until needed for execution. Note further that, in one embodiment of the present invention, software deploying server 149 performs all of the functions associated with the present invention (including execution of IMRL 147), thus freeing computer 101 from having to use its own internal computing resources to execute IMRL 147.

Computer 101 includes a positioning system, such as the depicted global positioning system (GPS) system 151 that utilizes space-based satellites to determine a geophysical location of computer 101 in real time.

Computer 101 also has access to one or more biometric sensors 153 (e.g., heart monitors, respiration monitors, skin thermometers, galvanic skin sensor to detect sweating, etc.), which are able to detect body heat, pupil size, respiration, skin sweat, etc. used to determine the current physiological and/or psychological state of a user.

Biometric sensors 153 may be integrated into a wearable computer. Examples of a wearable computer include, but are not limited to, garments (e.g., coats, shirts, pants, socks, gloves, hats, etc.) that have processing logic, sensors, and circuitry interwoven and/or otherwise integrated into the fabric of the garments; jewelry (e.g., bracelets, pendants, rings, etc.) that have processing logic, sensors, and circuitry integrated into the structure of the jewelry; etc.

Computer 101 also has access to environmental sensors 155, such as microphones, light sensors, vibration sensors, etc. that detect a current environment state (e.g., noise, light, darkness, motion, earthquakes, etc.) of computer 101 (and particularly user's mobile electronic device 157).

Computer 101 also has access to a user's mobile electronic device 157, such as a smart phone, a personal digital assistant (PDA), a wearable computer, etc. User's mobile electronic device 157 is an electronic device that is able to communicate with computer 101 and/or other electronic devices (including other users' electronic devices). Furthermore, user's mobile electronic device 157 is able to ascertain certain biometric, environmental, and other states associated with the user and/or environment around the user's mobile electronic device 157 (e.g., using its own copy/version of the environmental sensors 155, GPS system 151, transceiver 123, biometric sensors 153, etc. shown in FIG. 1.

Note that the hardware elements depicted in computer 101 are not intended to be exhaustive, but rather are representative to highlight essential components required by the present invention. For instance, computer 101 may include alternate memory storage devices such as magnetic cassettes, digital versatile disks (DVDs), Bernoulli cartridges, and the like. These and other variations are intended to be within the spirit and scope of the present invention.

As used in the present disclosure, a cognitive state is defined as a representation of measures of a user's total behavior over some period of time (including musculoskeletal gestures, speech gestures, internal physiological changes, measured by imaging devices, microphones, physiological and kinematic sensors in a high dimensional measurement space) within a lower dimensional feature space. One more preferred embodiments use certain feature extraction techniques for identifying certain cognitive states. Specifically, the reduction of a set of behavioral measures over some period of time to a set of feature nodes and vectors, corresponding to the behavioral measures' representations in the lower dimensional feature space, is used to identify the emergence of a certain cognitive state over that period of time. The relationship of one feature node to other similar nodes through edges in a graph corresponds to the temporal order of transitions from one set of measures and the feature nodes and vectors to another. Some connected subgraphs of the feature nodes are herein defined as a cognitive state. The present disclosure describes the analysis, categorization, and identification of these cognitive states by means of further feature analysis of subgraphs, including dimensionality reduction of the subgraphs, for example by means of graphical analysis, which extracts topological features and categorizes the resultant subgraph and its associated feature nodes and edges within a subgraph feature space.

BLE Beacons (or Bluetooth low energy beacons) and Wi-Fi sensors are among the most popular means of providing enhanced experiences for customers of venues, such as stadiums, airports, retail stores and hospitals. They can be used for a wide range of use cases from sales promotions to building security. These devices transmit a wireless Bluetooth or Wi-Fi signal to enabled devices, such as smart phones, that can notify an application on the device that it is within the proximity of a specified location, which could eventually present a promotion.

The present invention enables mobile devices to be intelligently excluded from messaging/notifications based on contextual and cognitive factors. That is, disclosed herein is a system and method to disregard (e.g., block at the receiving device or block at the transmission device) irrelevant messaging/messages to a specific user based on contextual and cognitive factors.

Figure 2:
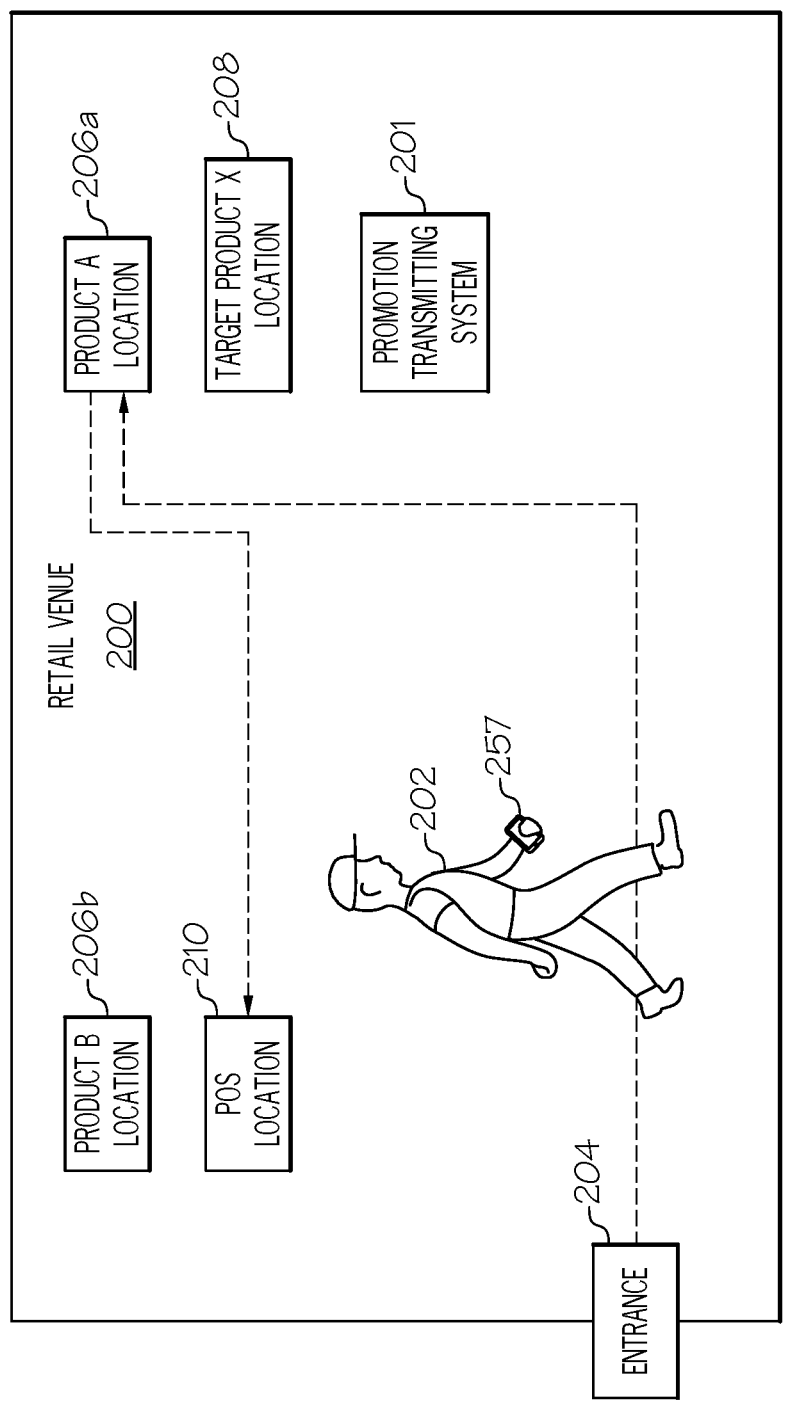
FIG. 2 and FIG. 3 illustrate an exemplary retail venue in which the present invention may be implemented.

For example, consider the retail venue 200 (e.g., a physical retail store) shown in FIG. 2 which has for sale a target Product X, shown positioned at target product X location 208 within the retail venue 200. Assume now that the proprietor (e.g., owner, manager, etc.) of the retail venue 200 and/or the manufacturer of Product X (e.g., a television) is willing to offer a real-time special deal (lower price, additional warranty, etc.) for a shopper who is currently within the retail venue 200. Such offers are broadcast wirelessly by a promotion transmitting system 201, which utilizes some or all of the components of computer 101 shown in FIG. 1 (including transceiver 123), and which may utilize BLE Beacons and/or Wi-Fi sensors/technology.

However, not all shoppers within retail venue 200 will be interested in receiving this offer. The present invention provides a novel technology-based solution to identify these uninterested shoppers, such that irrelevant messages (e.g., offers of the special deal for Product X) are blocked from being transmitted to, received by, and/or displayed on a mobile electronic device (e.g., a smart phone 257, analogous to user's mobile electronic device 157 shown in FIG. 1) being carried by the uninterested shopper (i.e., the depicted shopper 202).

Examples of triggers that will block such irrelevant messaging/messages may be contextual and cognitive. That is, contextual triggers are based upon transactional and/or financial factors related to the shopper 202, and cognitive triggers are based on current real-time physical, psychological, and/or biometric factors related to the shopper 202.

Examples of contextual triggers include a notification history, a location history, a purchase history, a financial status, and a shopping list of the shopper 202.

Notification History. Notification history describes whether or not shopper 202 has been sent a special offer for Product X or a product similar to Product X within a predetermined amount of time (e.g., within the past hour, week, etc.). More specifically, has the smart phone 257 being carried by shopper 202 received this promotion before within the predetermined amount of time? In one or more embodiments of the present invention, if shopper 202 has received a notification in the past that is similar to the triggered notification for Product X and has not acted upon it, then the new notification is ignored (e.g., blocked from being transmitted by the promotion transmitting system 101). For example, if shopper 202 has received a notification about the new television several times already and has not bought it or even traveled to a specialty store to look at it, then promotion transmitting system 201 will know not to send this irrelevant messaging to smart phone 257 again.

Location history. Location history is based on whether or not shopper 202 has visited target product X location 208 within a predetermined amount of time (e.g., within the past five minutes, the past week, etc.). Shopper 202 visiting target product X location 208 within the predetermined amount of time may be a positive or a negative factor. A positive factor is interpreted as a need to send the marketing messaging to the shopper 202, and a negative factor is interpreted as a need to block the irrelevant messaging transmission to the shopper 202 (i.e., via his/her smart phone 257).

As a positive factor, if shopper 202 has visiting target product X location 208 within the predetermined amount of time, this can be interpreted as an indication of interest in Product X by shopper 202. Alternatively, if shopper 202 has not visiting target product X location 208 within the predetermined amount of time, this can be interpreted as a need to provide shopper 202 with an enticement to visit target product X location 208 in order to look at Product X.

As a negative factor, if shopper 202 has visiting target product X location 208 within the predetermined amount of time, this can be interpreted as an indication that shopper 202 has looked at Product X in the past and simply is not interested in it. Alternatively, if shopper 202 has not visiting target product X location 208 within the predetermined amount of time, this can be interpreted as an indication that shopper 202 is simply not interested purchasing (or even looking at) televisions (i.e., Product X), regardless of any special deals being offered.

Purchase history. If shopper 202 has purchased a television (Product X) recently, then it is unlikely they he/she is going to purchase another one. Thus, any offer regarding Product X is irrelevant to the needs/desires of shopper 202, and will be blocked by promotion transmitting system 201.

Financial status. Assume that shopper 202 has a store credit card with retail venue 200, and that there is only $100 of available credit left on that store credit card. As such, the system will assume that shopper is not in a financial situation conducive to buying a new television (Product X). That is, if a user's account is running low they might not have the extra money to splurge on a big purchase such as a television. Thus, any offer regarding Product X will be blocked by promotion transmitting system 201.

Shopping list. Assume now that shopper 202 has entered a shopping list on smart phone 257. While it is unlikely that shopper 202 has entered a television (or any other expensive item) on this list, the shopping list may include a listing for paper towels. This need for paper towels by shopper 202 may also be derived from smart sensors in the home of shopper 202 (e.g., pressure sensors in shelving in a cabinet that automatically determine when the supply of paper towels is low), which may be transmitted (with the approval/permission of shopper 202) to the promotion transmitting system 201. Regardless of which technology provides promotion transmitting system 201 with information regarding the need for paper towels by shopper 202, if shopper 202 does not need any paper towels, then any promotional messaging to smart phone 257 is deemed irrelevant to the needs of shopper 202 and is blocked.

Some or all of the contextual trigger information a prospective customer described herein may be obtained from a social media database, in which the shopper 202 discusses the notification history, location history, purchase history, financial status, shopping list, etc. of shopper 202.

Examples of cognitive triggers include a shopping mode, a mobile device activity, and biometrics of shopper 202.

Shopping mode. If shopper 202 is in a hurry, he/she will likely make a bee-line to a specific location for the product(s) that he/she came to purchase, and then will turn around and head directly to the checkout station. For example, as shown in FIG. 2, shopper 202 went straight from the entrance 204 to product A location 206a, and then turned right around to check out at the point of sale (POS) location 210 (i.e., the checkout station) to pay for Product A. Shopper 202 never visited Product B location 206b or the target product X location 208 (even though it was next to product A location 206a). Using this information, the promotion transmitting system 201 can determine that the user (shopper 202) is likely to be in no mood to shop for items that he/she hadn't originally planned on purchasing. Offering a promotion for a new television (Product X) when shopper 202 merely ran into the retail venue 200 to quickly pick up a small ticket item (e.g., socks) is likely not going to result in a purchase of a large ticket item such as Product X (and may in fact be annoying to shopper 202).

Figure 3:
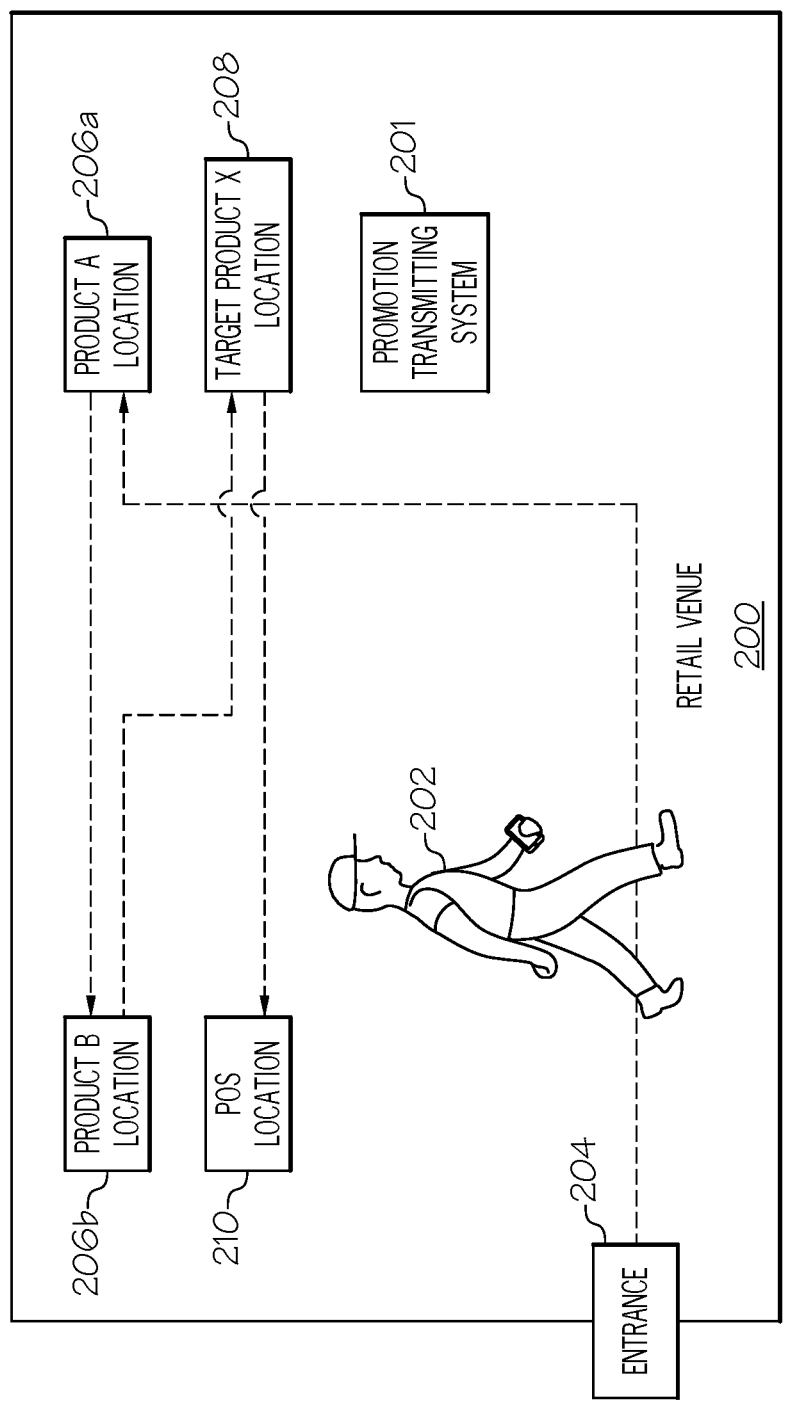

However, as shown in FIG. 3, if shopper 202 moves all about retail venue 200 (particularly at a leisurely pace), going to product A location 206a, and then to product B location 206b, and then to target product X location 208 before checking out at POS location 210, then he/she will be more likely to be interested in the promotional messaging about Product X.

Mobile Device Activity. If shopper 202 is spending a lot of time looking at his/her smart phone 257, such as exchanging emails, texting with friends, etc., then shopper 202 is likely not to be in a hurry and also likely to see a promotional message if it comes in. However, if shopper 202 is not interacting with her/her smart phone 257, this is viewed as an indication that shopper 202 is in a hurry (and/or may not even notice a promotional message). Thus, any promotional messaging is irrelevant and will be blocked by the promotion transmitting system 201 and/or the smart phone 257.

Biometrics. Shopper 202 may be wearing a biometric sensor (e.g., a dedicated heart monitor, etc.) or biometric sensors may be integrated into smart phone 257. If shopper 202 has authorized promotion transmitting system 201 to receive biometric sensor data from such as biometric sensor (e.g., biometrics sensors 153 described in FIG. 1), then promotion transmitting system 201 will know the mood of shopper 202 (e.g., if the heart rate of shopper 202 is low, then shopper 202 is likely calm). Based on these biometric readings, promotion transmitting system 201 will determine if a promotional messaging to smart phone 257 is appropriate (e.g., the shopper 202 is calm and will be receptive to the promotional messaging) or irrelevant (e.g., the shopper 202 is agitated and will simply be annoyed by the promotional messaging). If irrelevant, then the promotional messaging will be blocked by the promotion transmitting system 201 and/or the smart phone 257.

If the state of the shopper 202, as determined by the technological devices described herein, passes the criteria and the promotion/notification is relevant to the shopper 202, an event is triggered (i.e., the promotional messaging is sent, received, and accepted at the smart phone 257). If the state of the shopper 202 fails to meet the criteria, an alternative may be presented such as support documentation or FAQs sent to the smart phone 257, which are available to the shopper 202 to view at his leisure.

Thus, in one or more embodiments of the present invention, attributes about a particular potential customer (e.g., shopper 202) and/or his/her real time environment are obtained from a set of sensors, such as GPS system 151 and/or biometric sensors 153 and/or environmental sensors 155 shown in FIG. 1. Biometric sensors 153 reveal that a particular person has a particular walking gait, has high blood pressure, is agitated, etc. Environmental sensors 155 reveal the lighting, noise level, chemical presence, etc. of the potential customer in real time. GPS system 151 reveals the currently (real-time) location of the particular person within retail venue 200 or some other area.

In one or more embodiments of the present invention, determining whether or not the contextual triggers and/or cognitive triggers discussed above are accurate identifiers of whether or not shopper 202 will be interested in a promotional transmission is based on a history of other shoppers. Thus, one or more embodiments of the present invention use reverse correlated wearables signals to create a real time analysis of categorical buying behavior. In such a system, a wearable biometric time series (e.g., heart monitor) is streamed to a cloud resource. Upon purchase of a particular item the user encounters, the previous time series (up to a limit determined experimentally, for example, 1 hour) is labeled with the purchase data, store, location, item type, and other contextual information about the purchase.

These labels are then used to create a bio-spatio-temporal matrix for learning optimal push advertising (e.g., promotional messaging) through data and/or contextual analytics.

Subsequent to this leaning, the system then continually analyzes the time series in order to estimate the likelihood a user would alter their behavior in order to respond to a push advertisement. This likelihood is inferred based on previous (perhaps random) encounters with products of a particular type, at a particular location, or during a particular time of day, when the user's biological measure (e.g., heart rate) was in a similar state as that of shopper 202. In this way the objectives of limiting useless advertising, and reducing cost to vendors, is accomplished by inferring the appropriate state a user must be in to respond to an advertisement. This analysis method and system is referred to herein as a "Purchase-Oriented Cognitive Event Predictor" or PurCEP.

The system steps for implementing a PurCEP then are:

User shares wearable biometric time series data to a cloud resource;

User shares purchase information and other contextual information to the resource as labels;

When a certain number of purchases have been entered as labels, the system builds a classifier over the time series to predict subsequent purchase-oriented cognitive states; The classifier is introduced into a data analysis system; and By constant monitoring of time series and contextual information, the system provides predictive triggers for pushing advertising to the user when their PurCEP indicates the advertising is appropriate and likely to have an effect on user purchase behavior, and blocks such advertising when inappropriate/irrelevant based on factors described herein.

Figure 4:
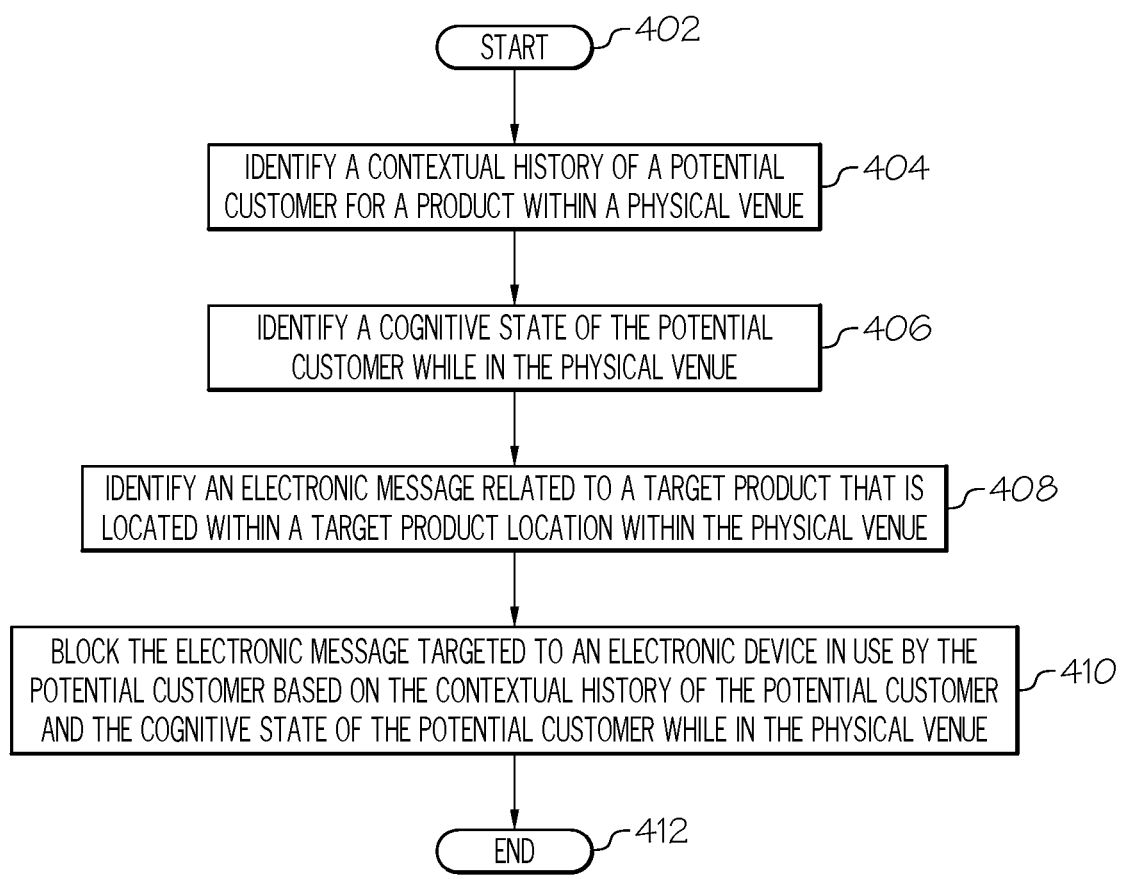
FIG. 4 is a high level flow chart of one or more steps performed by one or more processors and/or other hardware devices to block irrelevant messages to a user's electronic device in accordance with one or more embodiments of the present invention.

With reference now to FIG. 4, a high level flow chart of one or more steps performed by one or more processors and/or other hardware devices to block irrelevant messaging from a user's electronic device in accordance with one or more embodiments of the present invention is presented.

After initiator block 402, one or more processors identify a contextual history of a potential customer (e.g., shopper 202 depicted in FIG. 2) for a product (e.g., Product X as described herein) within a physical venue (e.g., retail venue 200 shown in FIG. 2), as described in block 404.

In an embodiment of the present invention and as described herein, the processor(s) identify the contextual history of the potential customer based on an electronic message (e.g., promotional messaging described herein) having been sent to the electronic device in use by the potential customer within a predetermined period of time past.

In an embodiment of the present invention and as described herein, the processor(s) identify the contextual history of the potential customer based on a history of the potential customer visiting a target product location within a predetermined period of time past.

In an embodiment of the present invention and as described herein, the processor(s) identify the contextual history of the potential customer based on the user having purchased a similar version of the target product within a predetermined period of past time.

In an embodiment of the present invention and as described herein, the processor(s) identify the contextual history of the potential customer based on an amount of available credit on a credit card account that was issued to the potential customer by a proprietor of the physical venue.

In an embodiment of the present invention and as described herein, the processor(s) identify the contextual history of the potential customer based on an absence of the target product on an electronic shopping list for the potential customer.

As described in block 406 in FIG. 4, the processor(s) identify a cognitive state of the potential customer while in the physical venue.

In an embodiment of the present invention and as described herein, the processor(s) identify the cognitive state of the potential customer while in the physical venue based on a pace of movement of the potential customer while in the physical venue.

In an embodiment of the present invention and as described herein, the processor(s) identify the cognitive state of the potential customer while in the physical venue based on a level of interaction between potential customer and an application on a mobile device while in the physical venue.

In an embodiment of the present invention and as described herein, the processor(s) identify the cognitive state of the potential customer while in the physical venue based on biometric readings of the potential customer while in the physical venue.

As described in block 408 in FIG. 4, the processor(s) identify an electronic message (e.g., a promotional messaging) related to a target product that is located within a target product location within the physical venue.

As described in block 410, the processor(s) block the electronic message targeted to a mobile electronic device in use by the potential customer based on the contextual history of the potential customer and the cognitive state of the potential customer while in the physical venue, such that the electronic message is deemed to be an irrelevant message.

The flow chart ends at terminator block 412.

In an embodiment of the present invention, once a decision is made by the system to block the electronic message, the analytics that were used to make this decision are presented to venue owner/manager are presented.

For example, assume that the venue is a retail store as described herein. As such, a local manager (e.g., a department manager, the store manager, etc.), a regional manager (e.g., a manager over venues in several states), or a corporate manager (e.g., a manager over operations for an entire enterprise) are provided with a notification describing specific of overall message blockings.

Thus, assume now that a manager is using an application that monitors such notification, and that this application has a user interface (UI) dashboard. Exemplary notices to appear on the UI dashboard may be specific ("Customer X's message regarding a special deal on televisions was blocked because he purchased a Television 2 days ago") or global ("23% of the '50% off televisions' promotion were blocked"). Thus, the manager is able to identify what messages were being blocked by the system and why.

In one embodiment, the manager can then override the blocking, causing the special messages to go through despite the system's analytical decision.

In one or more embodiments, the present invention is implemented in a cloud environment. It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
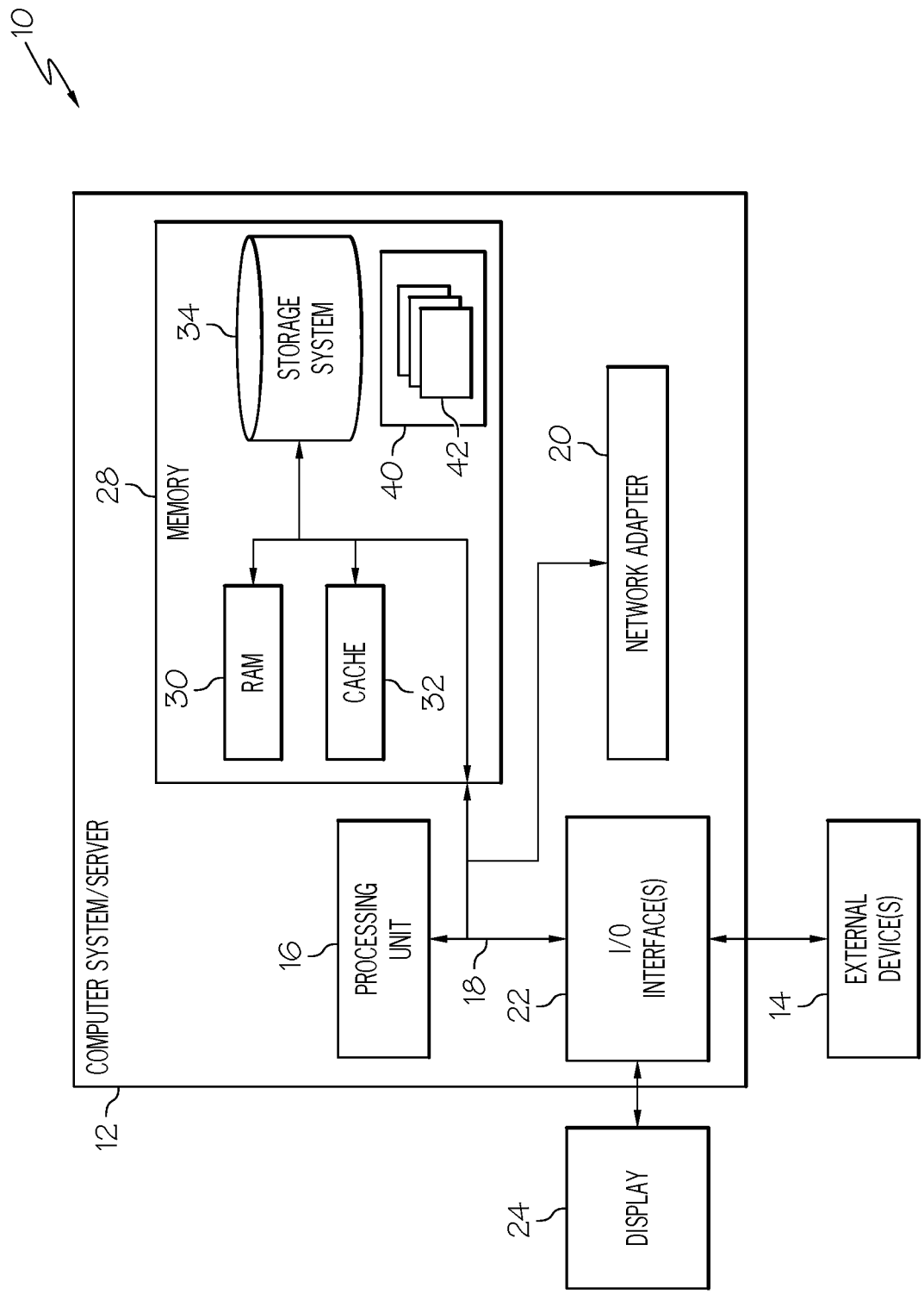
FIG. 5 depicts a cloud computing node according to an embodiment of the present disclosure.

Referring now to FIG. 5, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 5, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 6:
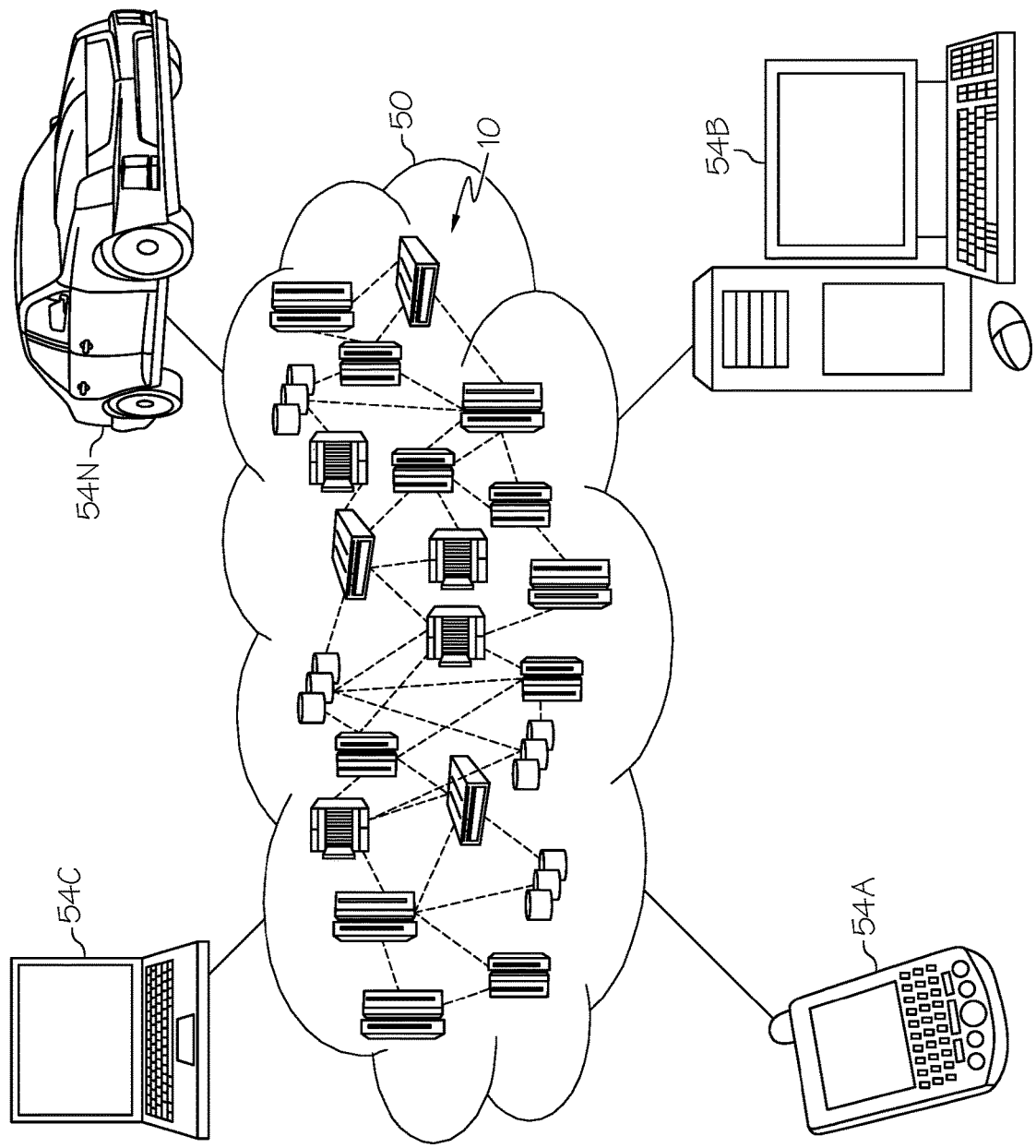
FIG. 6 depicts a cloud computing environment according to an embodiment of the present disclosure.

Referring now to FIG. 6, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
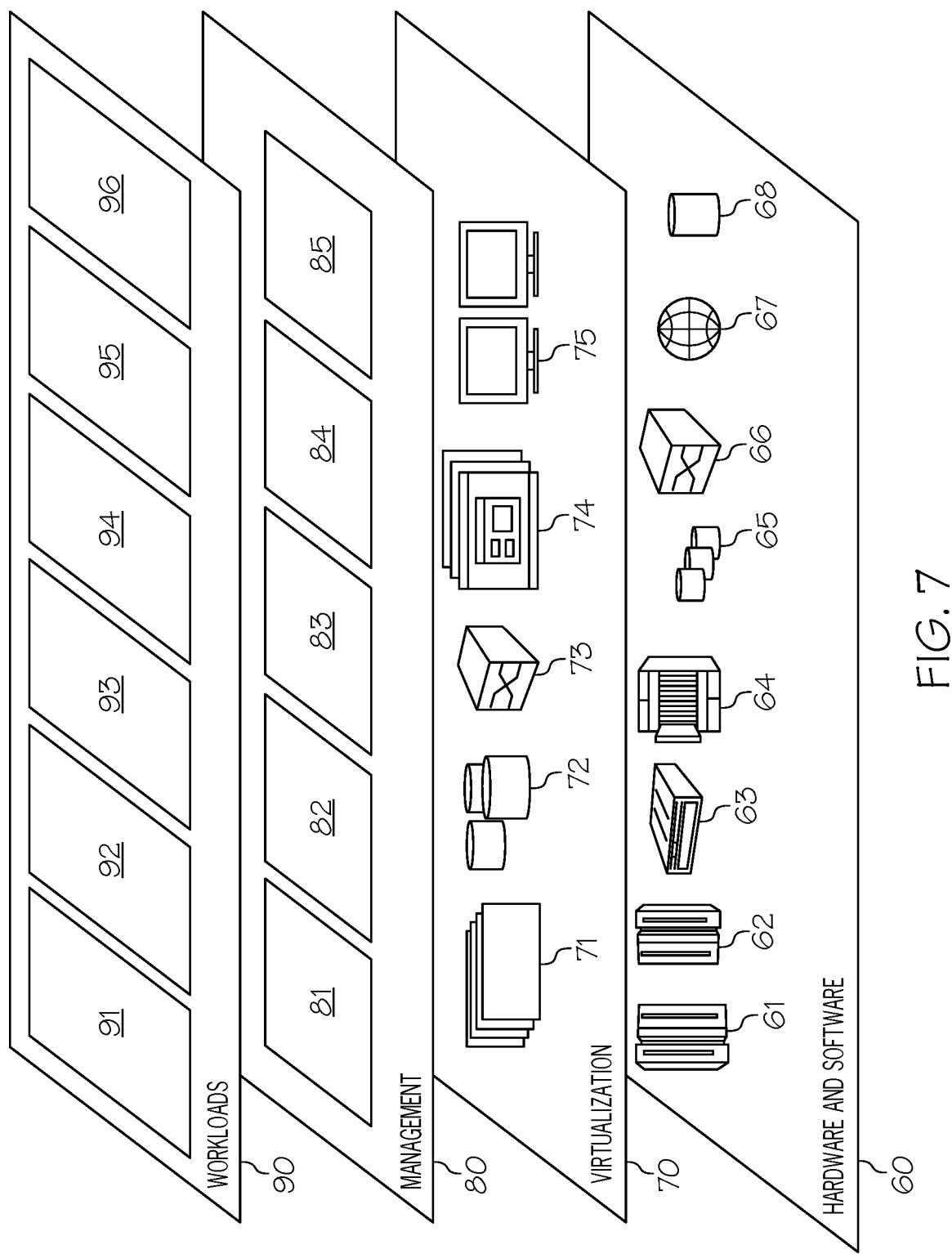
FIG. 7 depicts abstraction model layers according to an embodiment of the present disclosure.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and irrelevant messaging blocking processing 96 (for blocking and/or removing irrelevant messaging from a user's electronic device as described herein).

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the present invention in the form disclosed. Many modifications and variations will be apparent to those of ordinary skill in the art without departing from the scope and spirit of the present invention. The embodiment was chosen and described in order to best explain the principles of the present invention and the practical application, and to enable others of ordinary skill in the art to understand the present invention for various embodiments with various modifications as are suited to the particular use contemplated.

Any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as a FPGA.

Having thus described embodiments of the present invention of the present application in detail and by reference to illustrative embodiments thereof, it will be apparent that modifications and variations are possible without departing from the scope of the present invention defined in the appended claims.

What is claimed is:

1. A processor-implemented method of blocking irrelevant messages targeted to a mobile electronic device, the processor-implemented method comprising:
   identifying, by one or more processors, a contextual history of a person within a physical venue;
   identifying, by one or more processors, a cognitive state of the person while in the physical venue, wherein the cognitive state is represented by measures of physical gestures of the person over a particular period of time;
   further identifying, by one or more processors, the cognitive state of the person while in the physical venue based on a level of interaction between the person and an application on the mobile electronic device while in the physical venue;
   identifying, by one or more processors, an electronic message related to an item that is located within the physical venue; and
   blocking, by one or more processors, the electronic message targeted to the mobile electronic device in use by the person based on the contextual history of the person and the cognitive state of the person while in the physical venue, wherein the electronic message is deemed to be an irrelevant message about the item, and wherein blocking the electronic message blocks the mobile electronic device from receiving the electronic message.

2. The processor-implemented method of claim 1, further comprising: identifying, by one or more processors, the contextual history of the person based on the electronic message having been sent to the mobile electronic device in use by the person within a predetermined period of time past.

3. The processor-implemented method of claim 1, further comprising: displaying, by one or more processors, an explanatory message on a user interface, wherein the explanatory message provides: a description of the electronic message that was blocked; a reason for blocking the electronic message; and an option to override the blocking of the electronic message.

4. A computer program product for blocking irrelevant messages targeted to a mobile electronic device, the computer program product comprising a non-transitory computer readable storage medium having program code embodied therewith, the program code readable and executable by a processor to perform a method comprising:
   identifying a contextual history of a person within a physical venue;
   identifying a cognitive state of the person while in the physical venue, wherein the cognitive state is represented by measures of physical gestures of the person over a particular period of time;
   further identifying the cognitive state of the person while in the physical venue based on a level of interaction between the person and an application on the mobile electronic device while in the physical venue;
   identifying, by one or more processors, an electronic message related to an item that is located within the physical venue; and
   blocking the electronic message targeted to the mobile electronic device in use by the person based on the contextual history of the person and the cognitive state of the person while in the physical venue, wherein the electronic message is deemed to be an irrelevant message about the item, and wherein blocking the electronic message blocks the mobile electronic device from receiving the electronic message.

5. The computer program product of claim 4, wherein the method further comprises: identifying the contextual history of the person based on the electronic message having been sent to the mobile electronic device in use by the person within a predetermined period of time past.

6. A computer system comprising:
   a processor, a computer readable memory, and a non-transitory computer readable storage medium;
   first program instructions to identify a contextual history of a person within a physical venue;
   second program instructions to identify a cognitive state of the person while in the physical venue, wherein the cognitive state is represented by measures of physical gestures of the person over a particular period of time;
   third program instructions to further identify the cognitive state of the person while in the physical venue based on a level of interaction between the person and an application on a mobile electronic device while in the physical venue;
   fourth program instructions to identify an electronic message related to an item that is located within the physical venue; and
   fifth program instructions to block the electronic message targeted to the mobile electronic device in use by the person based on the contextual history of the person and the cognitive state of the person while in the physical venue, wherein the electronic message is deemed to be an irrelevant message about the item, and wherein blocking the electronic message blocks the mobile electronic device from receiving the electronic message; and wherein the first, second, third, fourth, and fifth program instructions are stored on the non-transitory computer readable storage medium for execution by one or more processors via the computer readable memory.

* * * * *